Patented July 28, 1942

2,291,469

UNITED STATES PATENT OFFICE 2,291,469

PROCESS OF PREPARING AZO DYES

Chester G. Gomeringer, Penns Grove, N. J., assignor to E. I. du Pont de Nemours & Company, Wilmington, Del., a corporation of Delaware No Drawing. Application September 13, 1940, Serial No. 356,661

5 Claims. (Cl. 260—143)

There is described in U. S. Patent 903,284 a process by which dinitro stilbene disulfonic acid is reacted in alkaline solution with the sulfo acids of aromatic amino azo compounds. All aromatic amino azo compounds are treated in the said patent as useful in the reaction, and dinitro dibenzyl disulfonic acid is described as equivalent to dinitro stilbene disulfonic acid. My research supports the accuracy of the patent with respect to both these statements. All aromatic amino azo compounds are useful, although in somewhat varying degrees. U. S. Patent 951,047 lists many useful examples of amino azo compounds which also support the general utility of amino azo compounds in this reaction.

It is an object of this invention to improve the process of preparing dyestuffs by reacting aromatic amino azo compounds with dinitro stilbene disulfonic acid and dinitro dibenzyl disulfonic acid, to produce azo dyes of improved filtering characteristics, to produce azo dyes of better tinctorial strength which have less tendency to stain animal fibers, and to produce them at low cost.

The objects of the invention are accomplished by reacting an aromatic amino azo compound with dinitro stilbene disulfonic acid or dinitro dibenzyl disulfonic acid in caustic soda solution containing 3.5% to 7.0% NaOH and in the presence of an excess of the said dinitro compound.

Preferred conditions of operation are illustrated in the following example:

Example

The base obtained from the coupling of one pound mole of diazotized sulfanilic acid (para amino benzene sulfonic acid) with one mole of alpha naphthylamine is dissolved in 8000 lbs. of water at 85°–90° C. with the aid of 45 lbs. (1.12 moles) 100% of caustic soda. There is then added with stirring, 652 lbs. 100% (1.37 moles) of dinitro stilbene disulfonic acid (as sodium salt) and 350 lbs. 100% (8.75 moles) caustic soda. The volume is adjusted to be equivalent to 10,000 lbs. of water and the charge heated to the boil (103°–104° C.) at atmospheric pressure. Boiling is continued for 4 hours, maintaining a constant volume by the necessary addition of water, after which time the reaction is considered complete. The alkali is neutralized with approximately 292 lbs. of 100% hydrochloric acid (8.0 moles) to a pH of 5.5. Approximately 53 lbs. of soda ash are then added to obtain a pH of 7.5–8.0.

Two thousand pounds of common salt are added. The charge is stirred over night, allowing the temperature to drop to 50°–60° C.

The dyestuff will be crystallized in a rapidly filterable form. The isolated press cake is dried in an air drier at 85°–90° C.

When the sulfanilic acid→alpha-naphthylamine base is substituted with the base obtained by coupling one mole of amino G acid with one mole of cresidine the boiling time is increased to five hours.

When the base obtained by coupling one mole of sulfanilic acid with one mole of aniline is used, the boiling time is increased to sixteen hours.

Another particularly satisfactory color is produced by this process when amino G-acid (2 naphthylamine-6:8-disulfonic acid) is diazotized and coupled to cresidine and then reacted with dinitro stilbene- or dinitro dibenzyl disulfonic acid.

The invention using these preferred conditions gives a 25% to 35% higher yield of product than is produced under the conditions described in U. S. Patent 903,284. Equally successful results are obtained with the use of dinitro dibenzyl disulfonic acid. The improvement produced is not in all cases as high as this, but in all cases there is an improvement. Illustrative thereof are the yields resulting from the condensation of dinitro dibenzyl disulfonic acid with the amino azo compounds formed from beta naphthylamine -4:8-disulfonic acid, when diazotized and coupled to meta toluidine; and those formed from aniline when diazotized and coupled to Cleves acid.

The concentration of caustic soda for preferred results is between 3.5% and 7.0%. The time, temperature, and volume used for carrying out the condensation, and the molecular ratios of the reactants may be varied. The conditions given in the example are illustrative of good practice.

My invention has the following advantages over the prior art: The yield of dyestuffs is increased 25% to 35% over that known to the prior art, the resulting dyestuffs have a higher tinctorial value, they filter more quickly, and they have less tendency to stain animal fibers.

As many apparently widely different embodiments of this invention may be made without departing from the spirit and scope thereof, it is to be understood that I do not limit myself to the specific embodiments thereof except as defined in the appended claims.

I claim:

1. The process which comprises reacting an amino azo aromatic compound with one of a group of compounds consisting of dinitro stilbene disulfonic acid and dinitro dibenzyl disulfonic acid in an aqueous solution of caustic soda containing 3.5% to 7% NaOH, the dinitro compound being present in an excess of about at least one-third.

2. The process which comprises reacting the compound amino G-acid→cresidine with dinitro stilbene disulfonic acid in aqueous NaOH solution containing 3.5% to 7.% NaOH in the presence of an excess of the said dinitro compound of the order of about .37 mole.

3. The process which comprises reacting the compound 2-naphthylamine-4:8-disulfonic acid→meta toluidine with dinitro stilbene disulfonic acid in aqueous NaOH solution containing 3.5% to 7.0% NaOH in the presence of an excess of the said dinitro compound of the order of about .37 mole.

4. The process which comprises reacting the compound sulfanilic acid→alpha naphthylamine with dinitro stilbene disulfonic acid in aqueous NaOH solution containing 3.5% to 7.0% NaOH in the presence of an excess of the said dinitro compound of the order of about .37 mole.

5. The process which comprises reacting the compound sulfanilic acid→aniline with dinitro stilbene disulfonic acid in aqueous NaOH solution containing 3.5% to 7.0% NaOH in the presence of an excess of the said dinitro compound of the order of about .37 mole.

CHESTER G. GOMERINGER.